United States Patent
Otsuki et al.

(10) Patent No.: US 6,327,114 B1
(45) Date of Patent: Dec. 4, 2001

(54) RECORDING MEDIUM DRIVING APPARATUS

(75) Inventors: Akira Otsuki; Akira Kurita, both of Tokyo (JP)

(73) Assignee: Alpine Electronics, Inc. (JP)

( * ) Notice: Subject to any disclaimer, the term of this patent is extended or adjusted under 35 U.S.C. 154(b) by 0 days.

(21) Appl. No.: 09/315,604

(22) Filed: May 20, 1999

(30) Foreign Application Priority Data

May 26, 1998 (JP) .................................................. 10-144230

(51) Int. Cl.$^7$ .................................................. G11B 17/04
(52) U.S. Cl. ........................................ 360/99.06; 369/77.2
(58) Field of Search .................................. 360/96.5, 96.6, 360/99.02, 99.03, 99.06, 99.07; 369/75.1, 75.2, 77.1, 77.2

(56) References Cited

U.S. PATENT DOCUMENTS

| | | | |
|---|---|---|---|
| 5,123,004 | * 6/1992 | Arai | 369/75.2 |
| 5,537,271 | * 7/1996 | Kumai et al. | 360/99.06 |
| 5,790,497 | * 8/1998 | Hayashi | 369/77.2 |
| 5,805,553 | * 9/1998 | Hamakawa et al. | 369/77.2 |
| 5,815,344 | * 9/1998 | Aoki | 360/99.06 |
| 6,014,358 | * 1/2000 | Kabasawa | 369/77.2 |
| 6,144,629 | * 11/2000 | Kurita et al. | 369/77.2 |

* cited by examiner

*Primary Examiner*—David L. Ometz
(74) *Attorney, Agent, or Firm*—Brinks Hofer Gilson & Lione

(57) ABSTRACT

A recording medium driving apparatus to be used with a recording medium comprises a unit having a driving section receiving a loaded recording medium recording information in the recording medium and/or reproducing the information recorded in the recording medium, and a holding member holding the recording medium and movable in an inserting direction toward the driving section and in a discharging direction leaving the driving section together with the recording medium; an elastic support member supporting the unit against a fixed section; an intermediate member movably supported by the fixed section and connected to the holding member; and a driving member connected to the intermediate member and causing, by the moving force thereof, the holding member to move in the inserting direction or in the discharging direction via the intermediate member; wherein a transmitting section for transmitting a driving force of the driving member to the intermediate member and a relief section for making the intermediate member movable relative to the driving member after the completion of movement of the holding member in the inserting direction are provided on a connecting section of the driving member and the intermediate member. By using this configuration, it is possible to reduce the weight of the unit to be elastically supported, and downsize and reduce thickness of the vibration preventive space and the entire apparatus.

20 Claims, 7 Drawing Sheets

RECORDING MEDIUM DRIVING APPARATUS

BACKGROUND OF THE INVENTION

1. Field of the Invention

The present invention relates to a recording medium driving apparatus. More particularly, the present invention relates to a recording medium driving apparatus provided with a vibration-proof mechanism elastically supporting a driving section which records information on a recording medium and/or reproduces the information recorded on the recording medium.

2. Description of the Related Art

In a recording medium driving apparatus such as an MD (mini-disk) player, upon insertion of a recording medium such as an MD from an insertion port formed on a front panel surface, the MD is temporarily housed in a holder provided opposite a back surface of the insertion port. The MD in the holder is transferred to a driving section arranged in the interior of the apparatus by a transfer means separately provided, for recording and/or reproduction of information.

When the aforementioned recording medium driving apparatus is mounted in an automobile, a reproduction error or a recording error such as a sound skip tends to be easily caused by vibrations of the automobile. It is therefore the conventional practice to prevent occurrence of such an error by providing a vibration-proof mechanism in an enclosure. The vibration-proof mechanism comprises a driving section and transfer means elastically supported in the enclosure by an elastic supporting member such as a damper or a coil spring, and absorbs vibration transmitted from the automobile body.

Upon insertion of the recording medium and transfer thereof to the driving section, however, the transfer means and the driving section are locked to the enclosure to accommodate insertion and transfer operations. Upon completion of transfer of the recording medium, locking is released into a state in which the driving section is elastically supported by an elastic supporting member (non-locked state) to accommodate recording of information on the recording medium and/or reproduction thereof.

In the above-mentioned conventional recording medium driving apparatus, however, when a driving source imparting a transfer force to the transfer means is elastically supported in the enclosure together with the transfer means and the driving section, the weight of the entire unit elastically supported becomes larger, and the inertia resulting from external vibration or impact becomes excessively large. It is therefore necessary to set a large vibration-proof space between the unit and the enclosure, which prevents downsizing of the entire apparatus.

When the weight of the unit to be elastically supported is to be reduced by providing a driving source imparting a transfer force to the transfer means on the fixing section on the enclosure side, a problem is posed in that the transfer means and a power transmitting mechanism for transmitting power of the driving source to the transfer means interfere with each other (collision), and as result, the unit to be elastically supported is constrained, thus making it impossible to obtain a sufficient vibration-proof effect.

BRIEF SUMMARY OF THE INVENTION

The present invention is directed to solving the conventional problems as described above. It has an object of providing a recording medium driving apparatus which permits both weight reduction of the unit supported by the elastic supporting member, and sufficient protection of the unit from vibration.

The present invention provides a recording medium driving apparatus to be used with a recording medium, the apparatus comprising:
   a unit, the unit having:
      a driving section, the driving section receiving a recording medium, the driving section comprising means for recording information in said recording medium and means for reproducing information recorded in said recording medium, and
      a holding member, the holding member holding said recording medium, the holding member movable relative to said driving section in an inserting direction toward said driving section and in a discharging direction away from said driving section;
   a fixed section;
   an elastic support member, the elastic support member supporting said unit against said fixed section;
   an intermediate member, the intermediate member movably supported on said fixed section and connected to said holding member;
   a driving member, the driving member connected to said intermediate member, the driving member having a moving force, the driving member causing, by the moving force thereof, said holding member to move in said inserting direction and in said discharging direction via said intermediate member;
   a connecting section, the connecting section connecting said driving member and said intermediate member;
   a transmitting section, the transmitting section provided on said connecting section, the transmitting section for transmitting said driving force of said driving member to said intermediate member;
   a relief section, the relief section provided on said connecting section, the relief section for making said intermediate member movable relative to said driving member after completion of movement of said holding member in said inserting direction,
   wherein said holding member is movable relative to said driving section while said holding member holds said recording medium.

The present invention further provides a recording medium driving apparatus to be used with a loaded recording medium, the apparatus comprising:
   a unit, the unit having:
      a driving section, the driving section receiving a loaded recording medium, the driving section comprising means for recording information in said recording medium and means for reproducing information recorded in said recording medium,
      a holder, the holder having means for accepting therein a recording medium, the holder movable in a first axis relative to said driving section in directions approaching and leaving said driving section, and
      a holding member, the holding member holding the recording medium inserted into the holder, the holding member movable in a second axis relative to said driving section in an inserting direction toward said driving section and in a discharging direction away from said driving section;
   a fixed section;
   an elastic support member, the elastic support member supporting said unit against said fixed section;

an intermediate member, the intermediate member movably supported on said fixed section and connected to said holding member;

a driving member, the driving member connected to said intermediate member, the driving member having a moving force, the driving member causing, by the moving force thereof, said holding member to move horizontally in said inserting direction and said discharging direction via said intermediate member;

a connecting section, the connecting section connecting said driving section and said intermediate member;

a transmitting section, the transmitting section provided on said connecting section, the transmitting section for transmitting said driving force of said driving member to said intermediate member a relief section, the relief section provided on said connecting section, the relief section for making said intermediate member movable relative to said driving member after completion of movement of said holding member in said inserting direction, wherein said holding member is movable relative to aid driving section while said holding member holds said recording medium.

The driving section receives, as a recording medium, a photomagnetic disk such as an MD (mini-disk); an optical disk such as a CD (compact disk) or a DVD (digital versatile disk); a magnetic disk such as an FD (floppy disk); a memory card; or a cassette tape. The driving section records information on this recording medium or reproduces such information from the recording medium, or both records and reproduces.

The elastic supporting member may comprise a damper member, such as an oil damper, or a spring member, such as a coil spring, or may be a combination of a damper member and a spring member.

The holding member may transfer the recording medium by holding it, or the holding member may engage a prescribed engagement section of the recording medium and pull it onto the driving member side.

The intermediate member may be cause linear movement of the holding member in the insertion/discharging directions through its own rotation, or the intermediate member may reciprocate together with the holding member in the insertion-discharging direction.

The intermediate member and the driving member are attached to the fixed section side, which includes the enclosure or a fixed chassis fixed to the enclosure, rather than to the unit side, which is elastically supported. It is therefore possible to reduce the weight of the unit to be elastically supported, thus permitting full display of the function of absorbing vibration of the unit brought about by the elastic supporting member in a limited vibration-proof space. It is thus possible to achieve downsizing and thickness reduction of the entire apparatus.

The intermediate member, which causes the holding member to move in the insertion-discharge directions, is connected to the driving member via a connecting section. A transmitting section provided on this connecting section transmits the moving force of the driving member via the intermediate member to the holding member. Immediately upon completion of movement of the holding member in the inserting direction, or simultaneously with such completion, connection between the driving member and the intermediate member is released by the relief section of the connecting section, whereby the intermediate member becomes movable relative to the driving member. Because the intermediate member can follow movement of the holding member notwithstanding provision thereof on the fixing section, it never constrains the elastic supporting state of the unit, and hence, never impairs the vibration absorbing function.

The connecting section is composed of a driving groove comprising the transmitting section and the relief section, formed on one of the driving member and the intermediate member, and a projecting section to be inserted into the driving groove, provided on the other of the driving member and the intermediate member. The driving groove has a larger width at the relief section than at the transmitting section. When the holding member is moved in the inserting direction, the projecting section is positioned in the transmitting section of the driving groove. Immediately after the completion of movement of the holding member in the inserting direction, or simultaneously with such completion, the projecting section should preferably enter the relief section of the driving groove.

The intermediate member is rotatably supported on the fixed section. The driving member is linearly reciprocatingly provided on the fixed section. The transmitting section and the relief section of the driving groove extend in directions perpendicular to each other, and the projecting section preferably moves from the transmitting section of the driving groove to the relief section along with rotation of the intermediate member.

In this configuration, the need for a driving source for forcedly transferring the projecting section from the transmitting section to the relief section is eliminated, thereby permitting simplification of the structure of the apparatus as a whole, and reduction of manufacturing cost.

In this configuration, the distance between the rotation center of the intermediate member and the projecting section is preferably set smaller than the distance between the rotation center of the intermediate member and the connecting point between the intermediate member and the holding member.

In this configuration, it is possible to set a large movable range of the intermediate section and the holding member relative to the driving member, and hence to downsize the apparatus without the risk of impairing the vibration absorbing function of the elastic supporting member.

In the present invention, the intermediate member and the holding member, which are transfer means of the recording medium, are provided separately on the fixing section side and the unit side elastically supported on the fixing section. These members are not, however, completely connected mechanically. In a preferable configuration, for example, a long groove extending in a direction perpendicular to the moving direction of the holding member in the horizontal plane and vertically passing through is formed in the holding member so that a pin provided on the intermediate member is inserted with a play in the long groove, and the pin is movable in the long groove in the moving direction of the holding member and in a direction perpendicular thereto.

More specifically, even when the unit including the holding member vibrates in any direction, the intermediate member never constrains the elastic supporting state of the unit, thus permitting sufficient prevention of vibration of the unit.

In the present invention, furthermore, the driving member is preferably provided with a regulating section which, when the holding member is caused to move in the discharge direction, engages directly or indirectly with the unit and locks it to the fixed section, and a play section which, when the holding member is caused to move in the inserting direction, releases engagement with the unit and allows elastic movement of the unit toward the fixed section.

In this configuration, it is possible, with a single driving member, to move the holding member in the inserting direction and in the discharge direction, and conduct locking/unlocking operations of the unit at a good timing.

BRIEF DESCRIPTION OF THE SEVERAL VIEWS OF THE DRAWING

FIG. 6A shows a standby state of an intermediate arm in relation to a driving member;

FIG. 6B shows a moving state of a rotated pin of the intermediate arm in relation to the driving member;

FIG. 6C shows a state in which the rotated pin leaves the transmitting section;

FIG. 6D shows plan views of recording and reproducing states of the intermediate arm in relation to the driving member.

DETAILED DESCRIPTION OF THE INVENTION

Embodiments of the present invention will now be described with reference to the drawings.

Figure 1A:
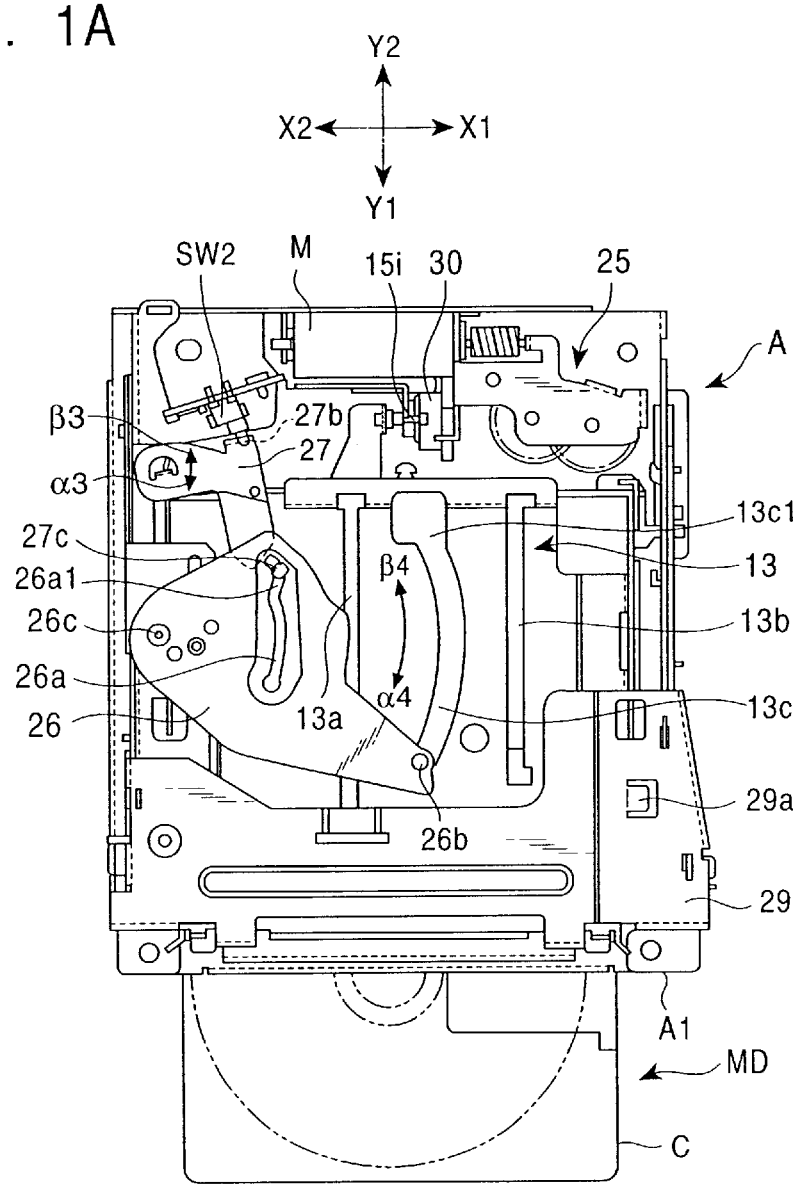
FIG. 1A is a plan view illustrating a disk driving apparatus arranged in an MD player according to the present invention.
Figure 1B:
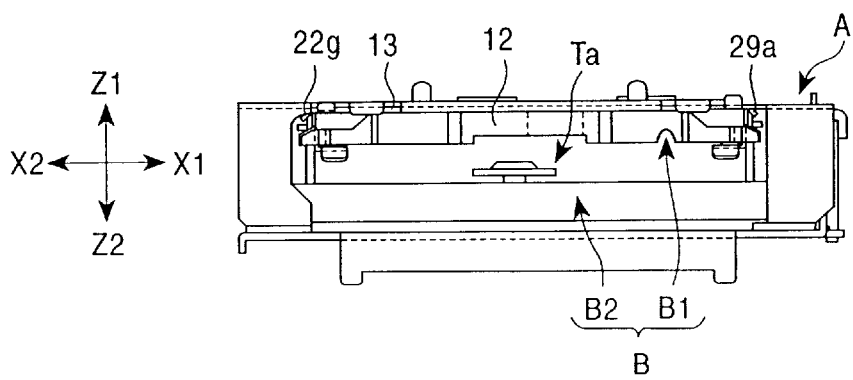
FIG. 1B is a front view of the apparatus of FIG. 1A.
Figure 2:
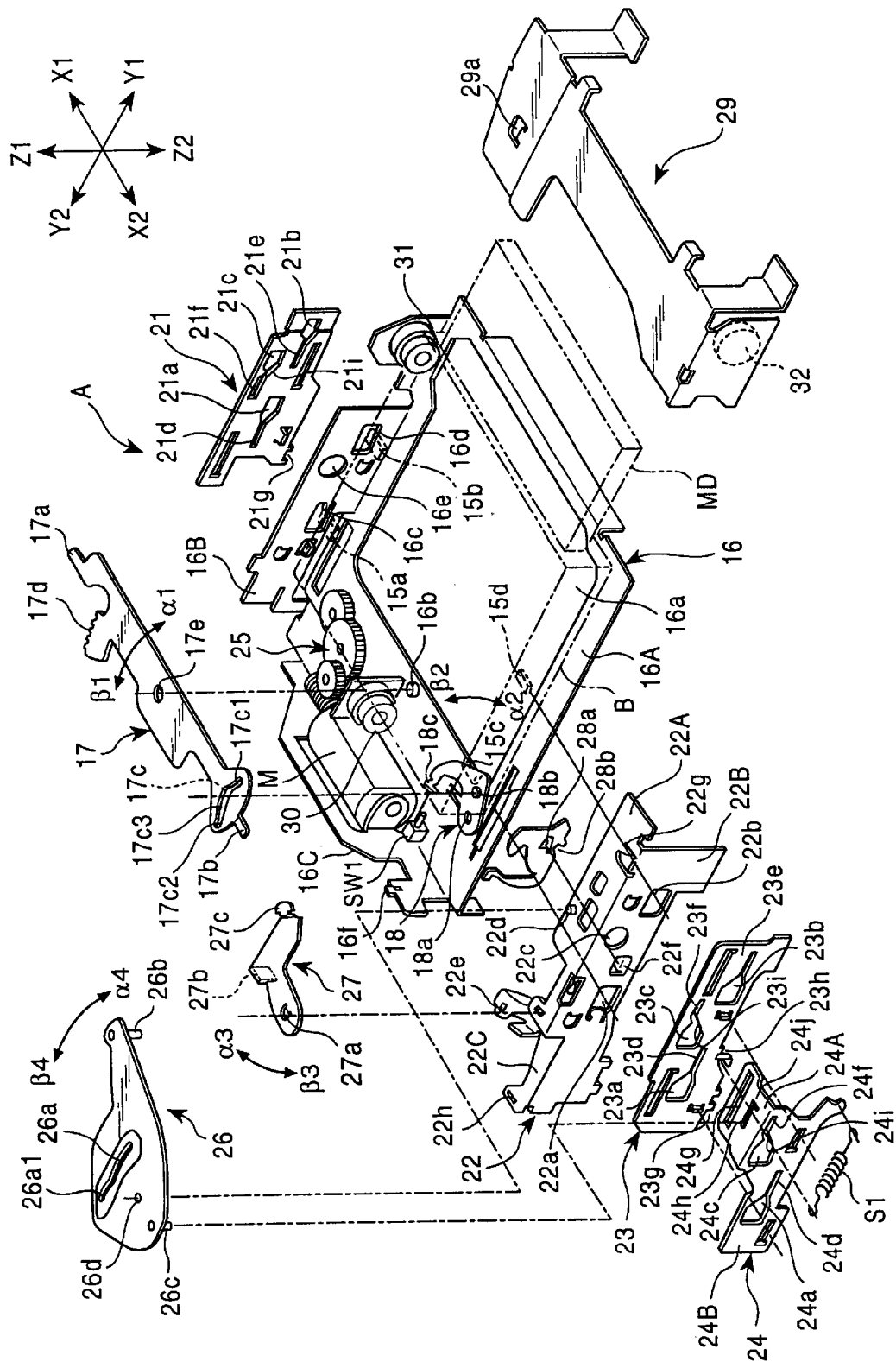
FIG. 2 is an exploded perspective view of the disk driving apparatus of FIG. 1A.
Figure 3:
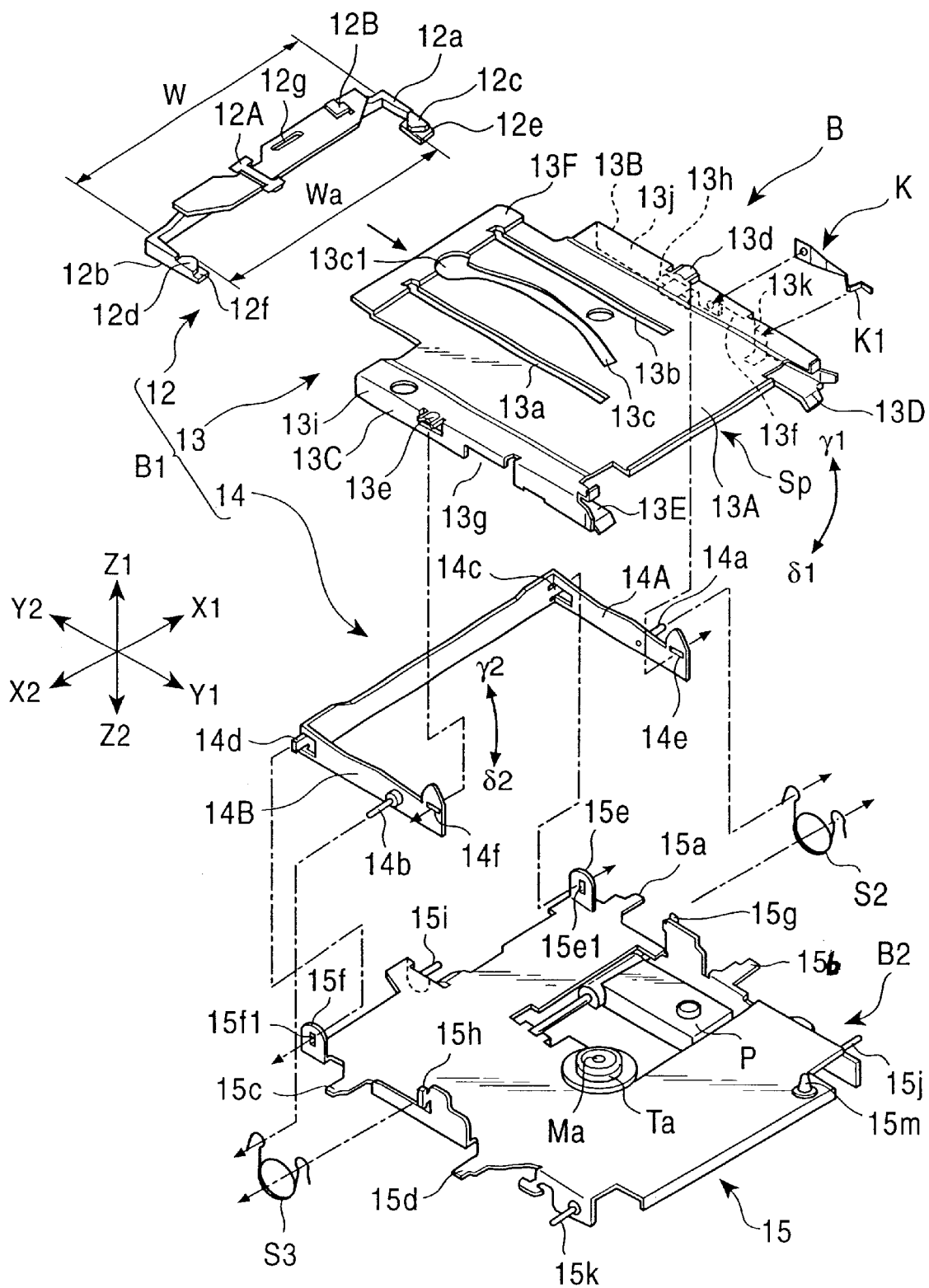
FIG. 3 is an exploded perspective view of a unit.

FIGS. 1A–3 illustrate an embodiment of the present invention. FIG. 1A is a plan view illustrating a disk driving apparatus arranged in an MD player; FIG. 1B is a front view thereof; FIG. 2 is an exploded perspective view of the disk driving apparatus shown in FIGS. 1A and 1B; and FIG. 3 is an exploded perspective view of a unit (a disk holding and driving sections).

Figure 7:
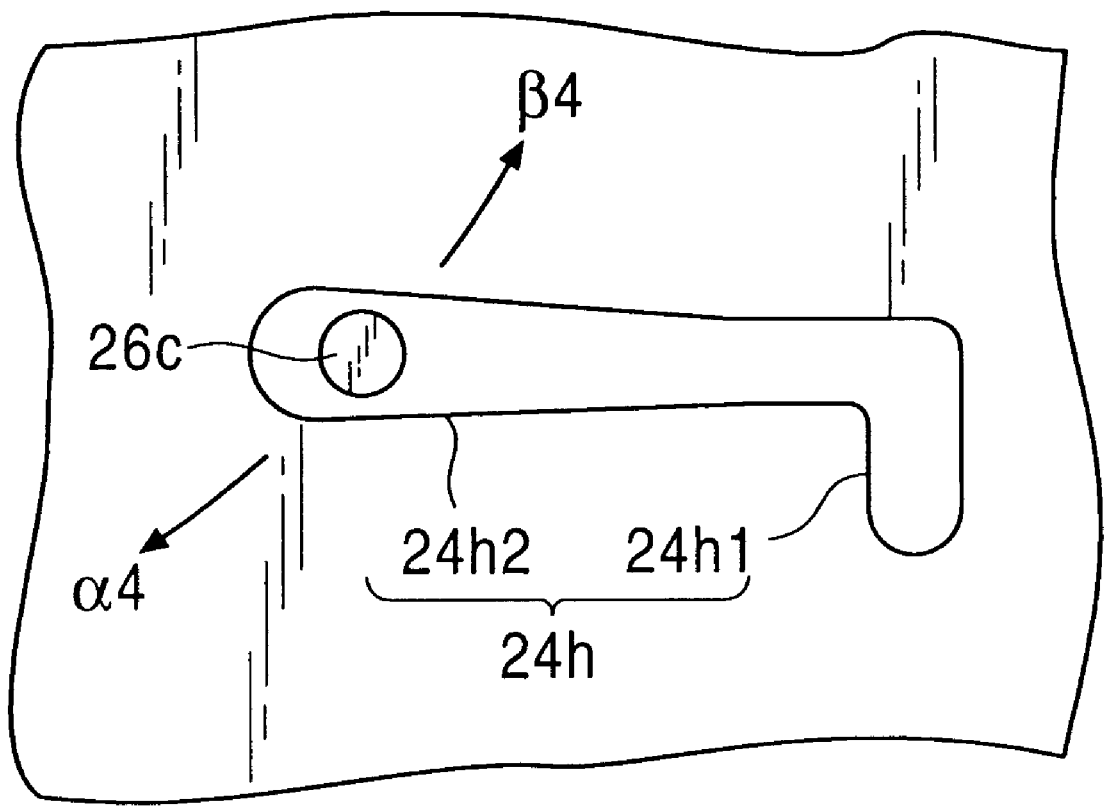
FIG. 7 is an enlarged plan view illustrating the relationship between a driving groove and the rotated pin of FIG. 6D.

Each of the drawings, except FIG. 7, has directional arrows. Arrows X1 and X2, Y1 and Y2, and Z1 and Z2 represent opposite directions of movement and location on the x-axis, the y-axis, and the z-axis, respectively. Greek letter arrows, such as α1 and β1, represent directions of rotation.

The disk driving apparatus A shown in FIGS. 1A and 1B is provided in an MD (mini-disk) player for mounting on an automobile, and reproduces signals recorded in the MD and/or records signals in the MD. The MD has width Wc (see FIG. 4). As shown in FIG. 1B, a surface on the Y1 side of the disk driving apparatus A serves as an insertion surface A1 for insertion of the MD, into the disk driving apparatus A. In the depth (Y2) direction of the insertion surface A1, there is provided a unit B comprising a disk holding section B1 and a disk driving section B2.

The disk holding section B1 is provided so as to face a disk inserting port formed on a front panel (not shown) of the MD player. The disk holding section B1 comprises a holding member 12, a holder 13, and a lifting member 14, each of which is described below.

In the disk driving apparatus A, as shown in FIG. 2, a unit B, represented by a one-point chain line in the drawing, is provided on a main enclosure 16, which is preferably formed by press-working a metal sheet. The main enclosure 16 has a bottom plate 16A, a side plate 16C, and a rear plate 16C.

A large hole 16a is formed in the bottom plate 16A. A rotation shaft 16b is formed into a projecting form near the edge on the Y2 side of the large hole 16a. The rotation shaft 16b is inserted into a rotation hole 17e formed at the center of a driving lever 17, whereby the driving lever 17 is supported rotatably in α1 and β1 directions in FIG. 2. A driving piece 17a is formed on the X1 side of the driving lever 17 and inserted into a transmitting section 21g of a first sliding member 21, described below. A fan-shaped gear section 17d is formed on X2 side of the driving piece 17a.

On the X2 side of the driving lever 17, a driving groove 17c and a driving piece 17b are formed. The driving piece 17b is engaged with a transmitting section 23g of a second sliding member 23, described below. The driving groove 17c has a first rotation groove 17c1 and a second rotation groove 17c2 formed thereon, and a middle portion 17c3.

Near a cover of the large rectangular hole 16a of the main enclosure 16, a rotation shaft 18a is supported on the bottom surface 16A. A first pressing member 18 is provided rotatably around the rotation shaft 18a. A convex portion 18b and a pressing piece 18c are formed on the first pressing member 18. The convex portion 18b is inserted into the driving groove 17c of the driving lever 17. The first pressing member 18 is rotated in α2 and β2 directions by causing the driving lever 17 to rotate in the α1 and β1 directions.

A first switch SW1 is provided proximate the first pressing member 18 at a position opposite the pressing piece 18c. When the first pressing member 18 is caused to rotate in the α2 and β2 directions, the pressing piece 18c presses an actuator of the first switch SW1, or releases pressing, to enable on-off switching of the first switch SW1.

A motor M for driving individual members of the disk driving apparatus A is attached to the rear plate 16c of the main enclosure 16. A reducing gear group 25 is connected to the driving shaft of the motor M, and the fan-shaped gear section 17d formed on the driving lever 17 engages with a gear of the reducing gear group 25. More specifically, the driving force of the motor M is transmitted via the reducing gear group 25, whereby the driving lever 17 is rotated in the α1 and β1 directions.

Holes 16c, 16d, and 16e are formed through the side plate 16B of the main enclosure 16. Holes 16c and 16d receive insertion of holding projections 15a and 15b provided on a driving base 15 of the disk driving section B2. The hole 16e receives insertion of a lifting pin 14a provided in a projecting form on a lifting member 14 of the disk holding section B1.

The first sliding member 21 moves in Y1–Y2 directions along the side plate 16B on the side surface on the X1 side of the main enclosure 16. When moving in the Y1 direction, the first sliding member 21 functions as locking means which constrains movement of the unit B. Insertion holes 21a, 21b and 21c are formed through the first sliding member 21. The holes 21a, 21b, and 21c receive insertion of the holding projections 15a and 15b of the driving base 15 and the lifting pin 14a of the lifting member 14, to correspond to the holes 16c, 16d and 16e in the side plate 16B. Regulating grooves 21d, 21e, and 21f extending in the Y2 direction are formed in the insertion holes 21a, 21b, and 21c, respectively. The regulating groove 21f is formed at a position closer to the Z1 direction than are the grooves 21d and 21e. A slant 21i is formed between the insertion hole 21c and the regulating groove 21f.

A fixed chassis 22 formed by bending a metal sheet into a cross-sectional shape of an L is provided on the X2 side of the main enclosure 16. The fixed chassis 22 comprises an upper plate 22A, a side plate 22B, and a support 22C formed at a position slightly lower than the upper plate 22A in the Z2 direction. An engagement piece 16f is provided on the upper end edge of the rear plate 16C of the main enclosure 16, and is inserted into a hole 22h formed at the Y2 side end of the support 22C. The leading end of the engagement piece 16f is secured to the main enclosure 16 through twisting, for example. Holes 22a, 22b, and 22c are formed through the side plate 22B. Holding projections 15c and 15d are provided on the driving base 15 of the disk driving section B2, and insert into the holes 22a and 22b, respectively. The hole 22c receives insertion of a lifting pin 14b provided in projection on the lifting member 14 of the disk holding section B1. On the upper plate 22A, a convex pressing piece 22g projecting from the upper plate 22A diagonally upward (in the Z2 direction) is formed.

The second sliding member 23, which slides in the Y1 and Y2 directions along the above-mentioned side plate 22B, and a third sliding member or driving member 24, which slides along the second sliding member 23, are provided on the X2 side of the fixed chassis 22. The second sliding member 23 serves as locking means which constrains movement of the unit B, together with the first sliding member 21, upon sliding in the Y2 direction.

The second sliding member 23 is, preferably, made of a metal sheet. Insertion holes 23a, 23b, and 23c are formed through the first sliding member 23, opposite the holes 22a, 22b and 22c of the side plate 22B, respectively. Regulating grooves 23d, 23e, and 23f following the insertion holes 23a, 23b and 23c, respectively, are formed on the Y1 side of the insertion holes 23a, 23b and 23c, respectively. The regulating groove 23f is formed at a position closer to the Z1 direction than are the grooves 23d and 23e. A slant 23i is formed between the insertion hole 23c and the regulating groove 23f.

The third sliding member 24, preferably, is also formed by press-working of a metal sheet, and has an upper plate 24A and side plate 24B. A long groove 24g extending in the Y direction and a driving groove 24h are formed in the upper plate 24A. The driving groove 24h is formed substantially in a cross-sectional shape of an L. The leading end on the Y1 side of the driving groove 24h forms a transmitting section 24h1 extending in the Y2 direction. The leading end of the driving groove 24h on the Y2 side forms a relief section 24h2 having a width gradually increasing in a fan shape (see FIG. 7).

Insertion holes 24a (first play section) and 24c (second play section) are formed in the side plate 24B opposite the holes 22a and 22c of the fixed chassis 22, respectively. Regulating grooves 24d (first regulating section) and 24f (second regulating section) are provided on the Y1 side of the insertion holes 24a and 24c, respectively. The regulating groove 24f is formed at a position closer to the Z1 direction than are the grooves 24d and 24e. A slant 24i is formed between the insertion hole 24c and the regulating groove 24f.

A force imparting member S1 comprising a coil spring or the like is stretched between the second sliding member 23 and the third sliding member 24. Of these, the second sliding member 23 is imparted a force on the Y1 side, and the third sliding member 24 is imparted a force on the Y2 side. In this state, the insertion hole 23a aligns with the insertion hole 24a; the insertion hole 23c aligns with the insertion hole 24c; the regulating groove 23d aligns with the regulating groove 24d; and the regulating groove 23f with the regulating groove 24f. Therefore, the holding projection 15c of the driving base 15 is inserted sequentially through the rectangular hole 22a of the fixed chassis 22, the insertion hole 23a of the second sliding member 23, and then the insertion hole 24a of the third sliding member 24, and the holding projection 15d is inserted sequentially through the rectangular hole 22b and the insertion hole 23b. Similarly, a lifting pin 14b of the lifting member 14 is inserted sequentially through the hole 22c of the fixed chassis 22, the insertion hole 23c of the second sliding member 23, and the insertion hole 24c of the third sliding member 24. Usually, while this state is maintained, the second sliding member 23 and the third sliding member 24 are made movable in the Y1–Y2 directions.

A locking member 28 is provided inside the fixed chassis 22. A supporting hole 28a is formed through the locking member 28 proximate its center. The locking member 28 is supported rotatably by the fixed chassis 22 as a result of insertion of a support section 22f formed by cutting up the side plate 22B of the fixed chassis 22 in the X1 direction. A stopper concave portion 28b is formed on the locking member 28. A stopper convex portion 23h projecting in the X1 direction from the second sliding member 23 engages the stopper concave portion 28b.

A supporting shaft 22d projecting in the Z1 direction is provided on the upper plate 22A of the fixed chassis 22. The supporting shaft 22d is inserted into a long groove 24g formed in the third sliding member 24. The leading end of the supporting shaft 22d is inserted into an insertion hole 26d of an intermediate arm or intermediate member 26. The intermediate arm 26 is supported rotatably in the α4 and β4 directions around the supporting shaft 22d as a rotational center.

A regulating hole 22e is formed through the upper plate 22A at a position closer to the Y2 side than is the supporting shaft 22d. A second pressing member 27 is presented. A regulating piece 27a is formed by bending in the Z2 direction from the second pressing member 27, and is inserted into the regulating hole 22e. As a result of the insertion, the second pressing member 27 is rotatable within a prescribed range in the α3 and β3 directions.

A pressing section 27b is formed by bending on the second pressing member 27, and a second switch SW is provided at a position opposite the pressing section 27b (see FIG. 1A). More specifically, the second switch SW2 can be on-off switched as a result of rotation of the second pressing member 27 in the α3 or β3 direction. Further, a bent piece 27c is formed at the end of the second pressing member 27 on the Y1 side, and this bent piece 27c is inserted into a guide groove 26a formed in the intermediate arm 26. The guide groove 26a has a first arcuate groove 26a1 thereon.

An insertion pin 26b extending in the Z2 direction, and a rotated pin or projection 26c positioned on the opposite side of the insertion pin 26b with the insertion hole 26d in between, are provided on the intermediate arm 26. The insertion pin 26b is inserted into a relief groove 13c formed in the holder 13 of the disk holding section B1 and an engagement groove or long groove 12g of the holding member 12. Along with rotation of the intermediate arm 26 in the α4–β4 directions, these insertions cause the holding member 12 to move in the Y1–Y2 directions (see FIG. 5A).

The rotated pin 26c is inserted into the driving groove 24h of the third sliding member 24. A connecting section connecting the third sliding member or driving member 24 and the intermediate arm or intermediate member 26 is composed of the driving groove 24h and the rotated pin or projection 26c. An engagement section connecting the holding member 12 and the intermediate arm or intermediate member 26 is formed by the engagement groove or long groove 12g and the insertion pin 26b.

A support frame 29 is attached to the main enclosure 16 on the Y1 side. A damper member 32 is secured to the inside surface of the support frame 29 on the X2 side. A pressing piece 29a projecting into a convex shape diagonally downward is formed on the upper surface of the support frame 29 on the X1 side.

Turning now to FIG. 3, the holding member 12 is made, for example, from a synthetic resin such as polyacetal by injection molding into a Π-shape. Holding arms 12a and 12b are formed at both ends of the holding member 12 on the X1 and X2 sides. The holding arms 12a and 12b are elastically deformable in the X-axis direction. At the leading ends thereof, holding projections 12c and 12d are integrally formed at positions opposite to each other.

Support sections 12e and 12f are integrally formed at the bottoms of the holding projections 12c and 12d on the Z2 side. Further, sliding sections 12A and 12B project from the upper surface of the holding member 12, and the engagement groove 12g extends in the X-axis direction and passes through in the Z-axis direction. The Y-axis width of the engagement groove 12g is substantially equal to the diameter of the insertion pin 26b, so that the holding member 12 is in a state in which, when the insertion pin 26b is inserted into the engagement groove 12g, it is not rickety in the Y-axis direction. The width W between opposite inner surfaces of the holding arms 12a and 12b is substantially equal to or slightly greater than the width Wc of the MD, and the distance Wa between the opposite surfaces of the holding projections 12c and 12d is smaller than the width W.

The driving base 15, the holder 13, the lifting member 14, and the disk driving section B2 are, preferably, formed by press-working metal sheets.

The holder 13 has side plates 13B and 13C formed by bending the side ends of the upper plate 13A. The side plates 13B and 13C are partially bent in a direction approaching each other, to serve as holding plates 13D and 13E guiding the lower surface of the MD. A step portion 13F is formed at the Y2 side end of the holder 13.

In the holder 13, there is formed an inner area Sp surrounded by the upper plate 13A, the side plates 13B and 13C, and the holding plates 13D and 13E. The MD is housed in this inner area Sp. That is, the holder 13 serves as a guiding member which guides movement of the MD in the Y1–Y2 directions. The Y1 side ends of the upper plate 13A, the side plates 13B and 13C, and the holding plates 13D and 13E are bent outward so as to permit easy guiding of the MD into the inner area Sp.

Figure 5A:
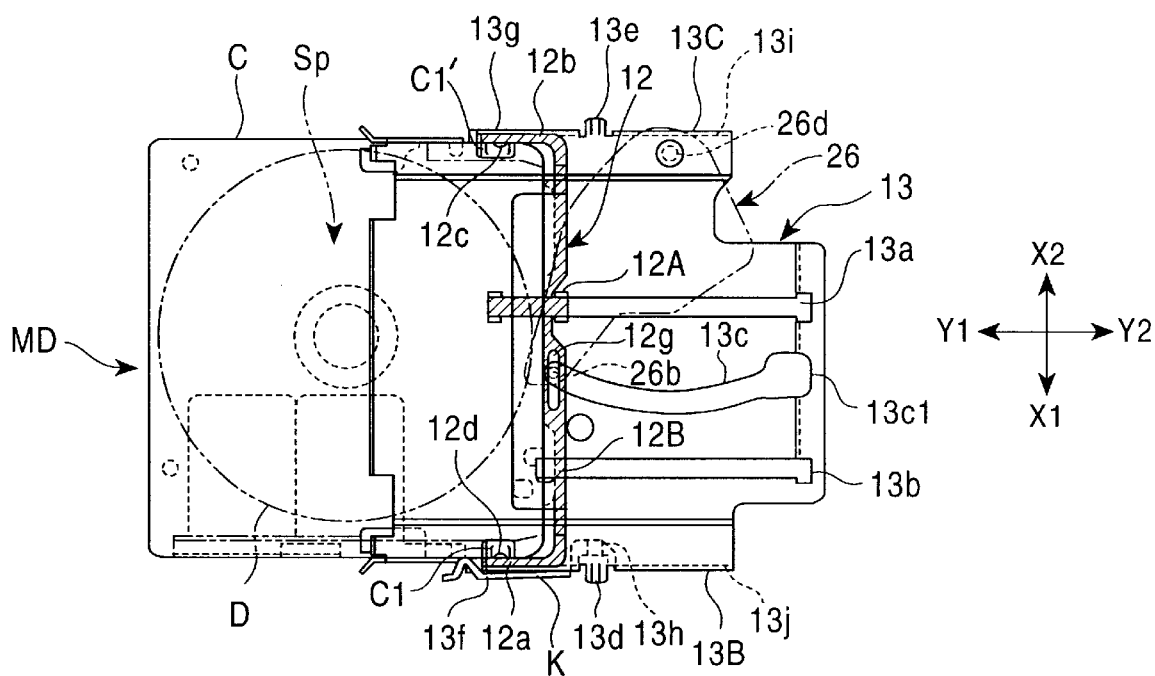
FIG. 5A is a plan view of an MD about to be inserted into a holder.

Guide grooves 13a and 13b are formed on the upper plate 13A of the holder 13 and linearly extend in the Y-axis direction. A relief groove 13c allowing arcuate operation of the insertion pin 26b is also formed on the upper plate 13A. As shown in FIG. 5A, the sliding sections 12A and 12B of the holding member 12 enter the guide grooves 13a and 13b, respectively, and the holding member 12 is supported movably in the Y-axis direction.

Figure 5B:
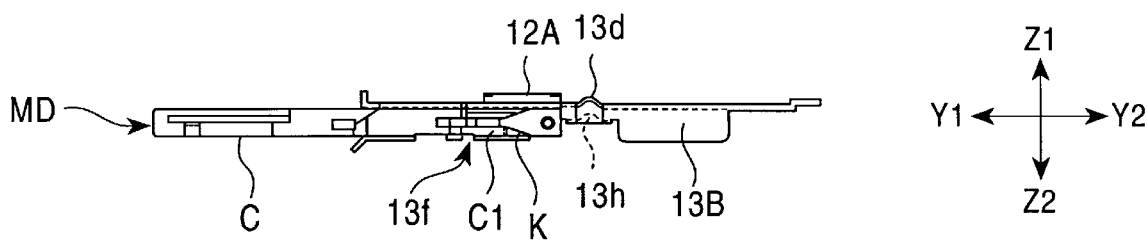
FIG. 5B is a side view of an MD about to be inserted into a holder.

Support sections 13d and 13e, extending in convex shapes, project at the ends of the upper plate 13A of the holder 13 in the X-axis direction. An extrusion extending in the Z1 direction is formed on each of the upper surfaces of the support sections 13d and 13e, and the support sections 13d and 13e are inserted into supporting holes 14e and 14f of the lifting member 14. Partially notched notch portions 13f and 13g are formed in the side plates 13B and 13C of the holder 13. When the holding member 12 is at a standby position, as shown in FIGS. 5A and 5B (the sliding sections 12A and 12B of the holding member 12 are positioned at Y1 side ends of the guide grooves 13a and 13b), the side surface of the Y1 side of the holding arm 12a and the side surface of the X2 side of the holding arm 12b face the notch portions 13f and 13g. The portions of the side plates 13B and 13C on the Y2 side from the notched portions 13f and 13g serve as regulating sections 13i and 13j. When the holding member 12 moves from the above-mentioned standby position in the Y2 direction, the outside surfaces of the holding arms 12a and 12b slide in friction with the inner surfaces of the regulating sections 13i and 13j, or move in an opposite relationship with the regulating sections 13i and 13j via a fine gap.

Figure 4:
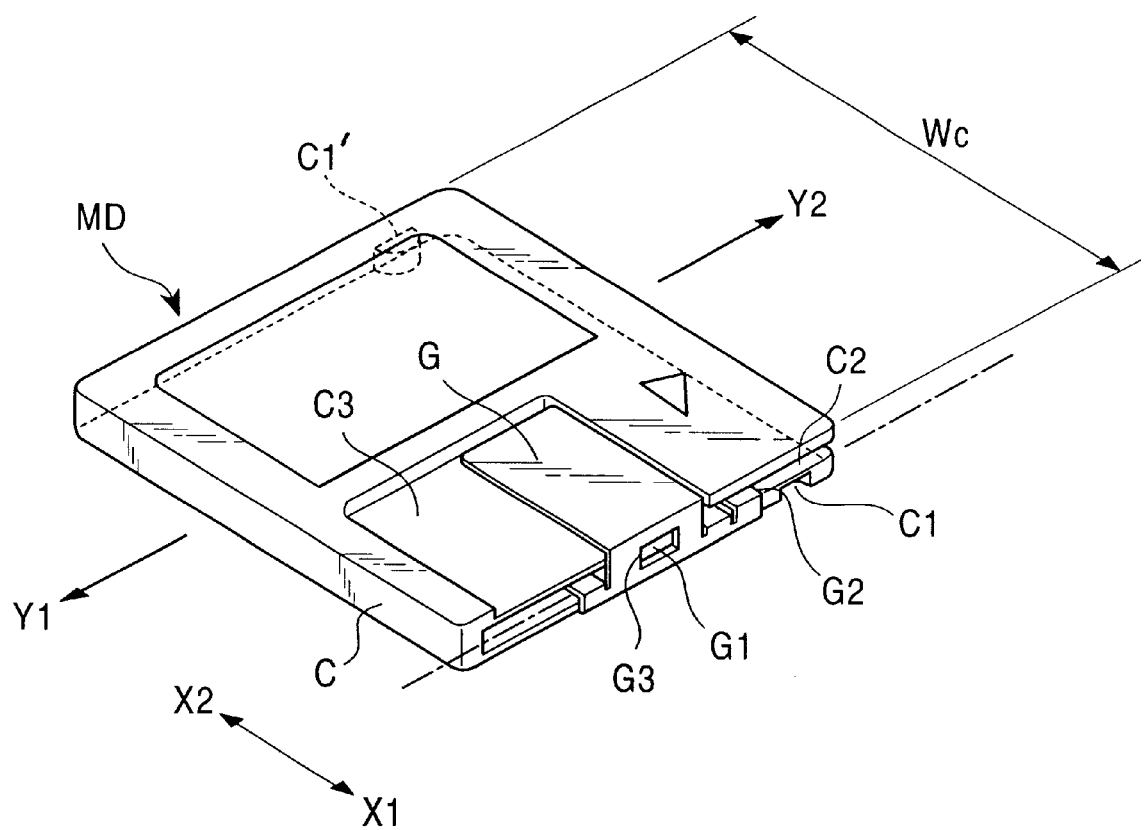
FIG. 4 is a perspective view illustrating an MD (mini-disk)

A closing member K comprising a leaf spring made of a metal is secured to the outside of the side plate 13B of the holder 13. A part thereof on the Y1 side forms a transmitting section K1 by bending in the X2 direction. The transmitting section K1 projects in the inner area Sp of the holder 13 and can enter a hole G1 formed in a shutter G of the MD, as shown in FIG. 4 and described below. An opening piece 13h is provided in the side plate 13B, and is partially formed by bending in the X2 direction as shown by the dotted line in the drawing.

The lifting member 14 is, preferably, formed by bending a metal sheet into substantially a Π-shape. Supporting arms 14A and 14B are disposed at the ends thereof and have the lifting pins 14a and 14b projecting therefrom. The lifting pin 14a is inserted into the hole 16e in the side plate 16B of the main enclosure 16 shown in FIG. 2 and the insertion hole 21c of the first sliding member 21. Similarly, the lifting pin 14b is inserted into the hole 22c of the fixed chassis 22, the insertion hole 23c of the second sliding member 23, and the insertion hole 24c of the third sliding member 24.

The supporting holes 14e and 14f are formed at the leading ends of the supporting arms 14A and 14B on the Y1 side. The support sections 13d and 13e of the holder 13 are inserted into these supporting holes 14e and 14f. The holder 13 is supported rotatably in the γ1 and δ1 directions with the support sections 13d and 13e as fulcra.

Convex portions 14c and 14d are formed on the Y2 side end of the lifting member 14.

Support sections 15e and 15f are bending-formed on the Y2 side of the driving base 15. Supporting holes 15e1 and 15f1 are formed through the support sections 15e and 15f. The convex portions 14c and 14d of the lifting member 14 are inserted into the interior of the supporting holes 15e1 and 15f1. The lifting member 14 is therefore supported slightly rotatably in the γ2 and δ2 directions, with the convex portions 14c and 14d as fulcra.

Engagement sections 15g and 15h are formed on the driving base 15. A force-imparting member S2 comprising a reversing spring is hooked between the engagement section 15g and the lifting pin 14a of the lifting member 14. Similarly, a force-imparting member S3 comprising a reversing spring is hooked between the engagement section 15h and the lifting pin 14b. The force-imparting members S2 and S3 are to impart a force in the Z1 or Z2 direction to the lifting pin 14a and 14b: the force-imparting members S2 and S3 press the holder 13 onto the driving base side via the lifting member 14, and push the holder 13 in a direction floating up from the driving base 15.

A turntable Ta bearing-supported by a rotation shaft Ma of a spindle motor (not shown), and a pickup linearly moving in the X1 and X2 directions relative to the turntable Ta, are provided on the driving base 15. Further, a locator pin 15m is provided on the Y1 side of the driving base 15. The pin 15a projects in the Z1 direction and is inserted into, and engages with, a positioning hole formed on the lower surface of the MD.

Supporting pins 15i, 15j, and 15k are provided on the driving base 15 and are elastically supported by elastic supporting members, such as dampers 30 and 31 provided in the main enclosure 16 and the damper 32 provided on the support frame 29. As such an elastic supporting member, for example, an oil damper sealing silicone oil or the like may be employed.

Further, an elastic supporting member, such as a coil spring (not shown) having an end engaged with the main enclosure 16 or the fixed chassis 22, is provided at a position close to each of the dampers 30, 31, and 32. The other end of each of the coil springs is secured to the driving base 15. More specifically, the unit B is elastically supported on the main enclosure by the dampers 30, 31, and 32, which are elastic supporting members, and elastically suspended by the coil springs, which are also elastic supporting members.

The insertion pin 26b of the intermediate arm 26 is inserted with a play into the relief groove 13c of the holder 13 and the engagement groove 12g of the holding member 12, thus connecting the intermediate arm 26 to the holding member 12. In this configuration, the pin 26b is not firmly connected mechanically to the unit B having the holder 13 and the holding member 12. When the unit B moves elastically in the X direction and the Z direction, therefore, this movement is never impaired by the insertion pin 26b of the intermediate arm 26. The intermediate arm 26 causing the holding member 12 to move in the Y1 and Y2 directions; the third sliding member 24, which is the driving member imparting a rotating force to the intermediate arm 26 through its own reciprocation; and the motor M serving as a driving source of the third sliding member 24, are all provided on the fixed section (the main enclosure 16 and the fixed chassis 22) side, not on the elastically supported unit B side.

Since the weight of the intermediate arm 26, the third sliding member 24, and the motor M never act on the unit B, it is possible to reduce the weight of the elastically supported unit B. As a result, the load of the unit B applied on the elastic supporting members, including the dampers 30, 31, and 32 and the coil springs (not shown), can be alleviated, and it is not necessary to provide a large space for preventing vibration between the fixed sections (the main enclosure 16 and the fixed chassis 22) and the unit B.

Operations of the disk driving apparatus A will now be described.

Standby State

In the standby state before insertion of the MD into the disk driving apparatus A, the driving lever 17 is at a position where engagement of the gear section 17d with the reducing gear group 25 has caused farthest rotation in the α1 direction. At this point, the driving piece 17a presses the transmitting section 21g of the first sliding member 21 in the Y1 direction, and the first sliding member 21 is at a position where the first sliding member 21 has moved farthest in the Y1 direction. The holding projections 15a and 15b of the driving base 15 enter from the insertion holes 21a and 21b of the first sliding member 21 into the regulating grooves 21d and 21e. Similarly, the lifting pin 14a of the lifting member 14 enters the regulating groove 21f.

Simultaneously with the above, the driving piece 17b of the driving lever 17 presses the transmitting section 23g of the second sliding member 23 in the Y2 direction. Therefore, the second sliding member 23 and the third sliding member 24, which is connected via the force-imparting member S1 to the second sliding member 23, are both at positions farthest in the Y2 direction. As a result, the holding projection 15c of the driving base 15 is in the regulating groove 23d of the second sliding member 23 and the regulating groove 24d of the third sliding member 24. Similarly, the holding projection 15d of the driving base 15 is in the regulating groove 23e of the second sliding member 23. Further, the lifting pin 14b of the lifting member 14 is in the regulating groove 23f of the second sliding member 23 and the regulating groove 24f of the third sliding member 24.

More specifically, all the holding projections 15a, 15b, 15c, and 15d of the driving base 15 enter the regulating grooves 21d, 21e, 23d, 23e, and 24d. As a result, the driving base 15 is in a locked state in which the driving base 15 cannot move up and down (Z-axis) or forward and back (Y-axis). Similarly, the lifting member 14 is in a locked state in which the lifting pins 14a and 14b are in the regulating grooves 21f, 23f, and 24f.

For the lifting member 14, the lifting pins 14a and 14b climb the slants 21i, 23I, and 24i, are lifted in the Z1 direction, and enter the regulating grooves 21f, 23f, and 24f. The lifting member 14 is thus rotated in the γ2 direction (see FIG. 3), and the holder 13 is held at a position floating in the Z1 direction from the driving base 15.

At this point, the upper plate 22A of the fixed chassis 22 and the support frame 29 having the pressing pieces 22g and 29a, respectively, are opposite to each other above the holder 13. At a position of the holder 13 floating up, as shown in FIG. 1B, the sides of the holder 13 come into contact with the pressing pieces 23g and 29g, respectively. As a result, the holder 13 is held so as not to move further in the X1 or X2 direction, rotation in the γ1 and δ1 directions (see FIG. 3) being inhibited.

In this state in which the holder 13 floats up from the driving base 15 and is held and positioned by the pressing pieces 22g and 29a, the holder 13 faces a disk insertion port provided on a front panel (not shown) of the MD player.

When the second sliding member 23 and the third sliding member 24 are moved in the Y2 direction, the rotated pin 26c of the intermediate arm 26 is engaged with the transmitting section 24h1 and pushed in the Y2 direction. As a result, the intermediate arm 26 rotates in the α4 direction around the supporting shaft 22d, and the insertion pin 26b moves in the relief groove 13c of the holder 13 in the Y1 direction. The holding member 12 consequently moves to the standby position before movement in the Y1 direction by the insertion pin 26b (see FIG. 1A). At this standby position, the holding arms 12a and 12b of the holding member 12 face the insides of the notches 13f and 13g formed in the side plates 13B and 13C of the holder 13.

Because, in the state before insertion of the MD, the driving lever 17 is at the extreme rotating position in the α1 direction, the convex portion 18b of the first pressing member 18 moves along the first rotation groove 17c1 of the driving groove 17c, and the first pressing member 18 is rotated in the α2 direction. As a result, the pressing piece 18c of the pressing member 18 is separated from the first switch SW1, and the first switch SW1 is in the off-state. More specifically, when the driving groove 17c has the middle portion 17c3 thereof positioned on a locus or orbit formed circular arc with a rotation hole 17e as the center, and the convex portion 18b of the first pressing member 18 is positioned in this middle portion 17c3, the first pressing member 18 is not driven, but is kept in a rotating state in the β2 direction. The first rotation groove 17c1 and the second rotation groove 17c2 at the ends of the driving groove 17c extend in inclination from the middle portion 17c3 in the X2 direction. Therefore, the first pressing member 18 is rotated in the α2 direction only when the convex portion 18b moves in the first rotation groove 17c1 and the second rotation groove 17c2 of the driving groove 17c.

In a state in which the intermediate arm 26 rotates in the α4 direction as shown in FIG. 1A, on the other hand, the bent piece 27c of the second pressing member 27 enters the first arcuate groove 26a1 on the Y2 side of the guide groove 26a. The second pressing means 27 is therefore rotated in the β3 direction. As a result, the pressing section 27b presses the second switch SW2 to bring the second switch SW2 into the on-state.

Introducing Operation of Recording Medium

FIG. 4 is a perspective view illustrating an MD (mini-disk). FIGS. 5A and 5B illustrate a state in which an MD is about to be inserted into a holder: FIG. 5A is a plan view and FIG. 5B is a side view.

As shown in FIGS. 4, 5A, and 5B, the MD, which is a recording medium, has an outside covered with a case C. A photomagnetic disk D is rotatably provided in the case C. The shutter G is provided slidably in the Y1 and Y2 directions on the MD. By moving the shutter G in the Y1 direction, the photomagnetic disk D provided inside is exposed, and ready for recording or reproducing information. Concave portions C1 and C1' are provided on the lower surfaces of the sides of the leading end on the Y2 side in the inserting direction of the MD. As described above, the width Wc of the MD is equal to, or slightly smaller than, the width W between the holding arms 12a and 12b of the holding member 12, and larger than the distance Wa between the holding projections 12c and 12d.

As shown in FIGS. 5A and 5B, at the standby position where the holding member 12 has moved farthest in the Y1 direction, the holding arms 12a and 12b of the holding member 12 face the insides of the notches 13f and 13g formed on the side plates 13B and 13C of the holder 13. As a result, both the holding arms 12a and 12b are allowed to elastically deform in the X-axis direction, thus permitting expansion of the width between the holding arms 12a and 12b.

When insertion of the MD into the inner area Sp of the holder 13 is started, the ends of the leading end of the MD first come into contact with the holding projections 12c and 12d provided at the leading ends of the holding arms 12a and 12b. Along with the insertion of the MD, the holding arms 12a and 12b elastically deform in the X-axis direction to enter the notches 13f and 13g. As a result, the distance Wa between the holding projections 12c and 12d is expanded, so that the leading end of the MD can pass through between the holding projections 12c and 12d. Further, when the MD is inserted, the holding projections 12c and 12d enter the concave portions C1 and C1' at the ends of the MD under the effect of elastic restoring force of the holding arms 12a and 12b. As a result, the MD is softly stopped from the sides by the holding member 12 and held. When the leading end side of the MD comes into contact with the holding projections 12c and 12d of the holding member 12, a pressing force acts in the Y2 direction on the holding member 12. Since the holding arms 12c and 12d elastically deform in the X-axis direction with a force smaller than the imparted force of the force imparting member giving a force in the α4 direction to the intermediate arm 26, the holding member 12 is held at the standby position.

When the MD is further pushed in from this state in the Y2 direction, the holding member 12 is pressed in the Y2 direction. The insertion pin 26b of the intermediate arm 26 is inserted in the engagement groove 12g of the holding member 12. As a result of movement of the holding member 12 in the Y2 direction under pressing, therefore, the insertion pin 26b is pressed against the inner wall of the engagement groove 12g, thus causing rotation of the intermediate arm 26 in the β4 direction. Upon rotation of the intermediate arm 26 in the β4 direction, the rotated pin 26c engaged with the transmitting section 24h1 of the third sliding member 24 presses the third sliding member 24 in the Y1 direction via the transmitting section 24h1.

At this point, the driving piece 17b of the driving lever 17 is engaged with the transmitting section 23g of the second sliding member 23, and the gear 17d of the driving lever 17 engages with the gear of the reducing gear group 25 into a fixed state in which rotation thereof is limited. As a result, only the third sliding member 24, which is slidable relative to the second sliding member 23, is moved in the Y1 direction by the rotated pin 26c.

The force imparting member S1 provided between the second sliding member 23 and the third sliding member 24, under the effect of movement of the third sliding member 24, is stretched against the imparting force thereof. As a result, when, after insertion of the MD into the inner area Sp of the holder 13 and the start of rotation of the intermediate arm 26 in the β4 direction, restoration of the force imparting member S1 to the original contracting state causes the third sliding member 24 to return in the Y2 direction, the intermediate arm 26 is rotated in the α4 direction, thus permitting return of the holding member 12 to the initial standby position (where it has moved farthest in the Y1 direction).

When the MD is further pushed in and the intermediate arm 26 rotates in the β4 direction, the bent portion 27c of the second pressing member 27 moves in the first arcuate groove 26a1 of the intermediate arm 26, and then enters the guide groove 26a.

At this point, as shown in FIG. 1A, the second pressing member 27 is rotated slightly in the α3 direction along the first arcuate groove 26a1. As a result, the pressing section 27b leaves the second switch SW2, which is changed over to off-state. The off-state of the second switch SW2 is maintained until the completion of the introducing operation of the MD.

Changeover of the second switch SW2 is transmitted to a control section (not shown), such as a micro-computer installed in the player. The control section detects insertion of the MD from changeover of the second switch SW2, and the motor M is started via a motor driver (not shown).

The rotation driving force of the motor M is transmitted to the gear 17d of the driving lever 17 via the reducing gear group 25, and causes the driving lever 17 to rotate in the β1 direction. As a result, the second sliding member 23 and the third sliding member 24, which are connected via the force imparting member S1, are both moved in the Y1 direction.

At this point, the transmitting section 24h1 of the upper plate 24A of the third sliding member 24 moves in the Y1 direction while engaging with the rotated pin 26c of the intermediate arm 26. As a result, the intermediate arm 26 is further rotated in the β4 direction around the supporting shaft 22d, and the holding member 12 is withdrawn in the Y2 direction.

The MD is held between the holding arms 12a and 12b of the holding member 12. The MD, together with the holding member 12, is withdrawn in the Y2 direction. More specifically, when a prescribed amount of MD is inserted into the inner area Sp of the holder 13, the MD is thereafter automatically withdrawn into the disk driving apparatus A under the effect of the rotation driving force of the motor M.

Upon movement of the holding member 12 in the Y2 direction, the holding arms 12a and 12b come off the positions facing the notches 13f and 13g of the holder 13 in the Y2 direction. The holding arms 12a and 12b move while sliding on the inner surfaces of the regulating sections 13i and 13j formed at the depth (Y2 side) of the notches 13f and 13g of the side plates 13B and 13C of the holder 13, or while being opposite to the regulating sections 13i and 13j with a slight gap in between.

As a result, the holding arms 12a and 12b are regulated from elastic deformation toward opening in the X-axis direction while being constrained by the regulating sections 13i and 13j. More specifically, the width W between the holding arms 12a and 12b and the distance Wa between the holding projections 12c and 12d can be kept substantially constant. The holding projections 12c and 12d therefore never come off the concave portions C1 and C1' of the MD, and the MD is pulled in by the holding member 12 in the Y2 direction without fail.

If the MD is deformed, transfer may be started in a state in which the holding projection 12c or 12d cannot securely enter the concave portions C1 and C1' of the MD. In this case, transfer operation of the MD is carried out while the holding arms 12a and 12b are kept in the notches 13f and 13g of the holder 13. When the outside surfaces of the holding arms 12a and 12b come into contact with the regulating sections 13j and 13i of the side plates 13B and 13C, respectively, pressing acts inward. As a result, the holding projection 12c or 12d forcedly enters the inside of the concave portions C1 and C1'.

As a result, the MD is firmly held by the holding member 12, guided in the holder 13, and introduced onto the disk driving section B2.

Immediately upon the completion of movement of the holding member 12 holding the MD in the Y2 direction, and introduction of the MD to a prescribed position on the disk driving section B2, or simultaneously with the completion of transfer of the holding member 12 in the Y2 direction, rotation of the driving lever 17 in the Pi direction causes the first sliding member 21 to move in the Y2 direction. The lifting pin 14a of the lifting member 14 goes down from the interior of the regulating groove 21f, through the slant 21i, into the insertion hole 21c.

Similarly, because the second sliding member 23 and the third sliding member 24 move in the Y1 direction, the lifting pin 14b of the lifting member 14 goes down from the interiors of the regulating grooves 23f and 24f, through the slants 23i and 24i, into the insertion holes 23c and 24c.

When the lifting pins 14a and 14b are brought down on the slants 21i, 23i and 24i, the lifting member 14 thereafter receives a rotational force from the force imparting members S2 and S3, which comprise reversing springs. As a result, the holder 13, connected to the lifting member 14 via the supports 13d and 13e, is brought down in the Z2 direction, and a center hub of the photomagnetic disk D in the MD held in the holder 13 is mounted (magnetically attracted) on the turntable Ta of the disk driving section B2. At this point, the locator pin 15m of the driving base 15 engages with a positioning hole on the lower surface of the MD, thereby untransferably positioning the case C of the MD on the driving base 15.

Simultaneously with this, the holding projections 15a and 15b of the driving base 15 go from the regulating grooves 21d and 21e of the first sliding member 21 into the insertion holes 21a and 21b, respectively. The holding projections 15c and 15d of the driving base 15 also go from the regulating grooves 23d, 24d and 23e into the insertion holes 23a and 24a, respectively. This releases locking of the driving base 15 in the Z and Y directions.

For the unit B, constraint of all the holding projections 15a, 15b, 15c and 15d and the lifting pins 14a and 14b, which are locked portions, is released into a non-locked state. As a result, the unit B is elastically supported in the X, Y, and Z directions by the elastic supporting members such as the dampers 30, 31, and 32 and the coil springs (not shown) within the fixed portions, such as the main enclosure 16 and the fixed chassis 22.

When the holder 13 descends in the Z2 direction, the holding member 12, which is slidable relative to the holder 13, also descends integrally therewith. The engagement groove 12g into which the insertion pin 26 is inserted also descends along the insertion pin 26b. The insertion pin 26b has a length sufficient to prevent the descending holding member 12 from coming off the engagement groove 12g.

During introduction of the MD into the holder 13 while being held by the holding member 12, the opening piece 13h formed in the holder 13 enters the guide groove C2 on the side surface of the MD on the X1 side, and releases locking of a locking member (not shown) provided in the MD. The opening piece 13h presses the transmitting section G2 of the shutter G relatively in the Y1 direction. The shutter G is released along with the introducing operation, opening the opening window of the MD, and the photomagnetic disk D is thus exposed. Upon mounting of the center hub of the photomagnetic disk D onto the turntable Ta, the recording surface of the photomagnetic disk D exposed from the opening window of the MD faces a pickup P, thus completing the introducing operation of the MD.

Upon the completion of the introducing operation of the MD, the driving lever 17 has rotated farthest in the β1 direction. At this point, the convex portion 18b of the pressing member 18 enters the second rotation groove 17c2 in the driving groove 17c of the driving lever 17. The first pressing member 18 is consequently rotated in the α2 direction, and the pressing piece 18c leaves the first switch SW1. The first switch SW1 is changed over to off-state.

The aforementioned control section (not shown) detects the completion of the introducing operation of the MD by detecting a changeover of the first switch SW1 into off state. In the control section, the photomagnetic disk D in the MD is rotated by rotation-driving a spindle motor (not shown), and causing the pickup P to slide in the X-axis direction (see FIG. 4), to perform reproduction or recording of information.

The relationship between the intermediate arm or intermediate member 26 and the third sliding member or driving member 24 will now be described in detail.

Figure 6A:
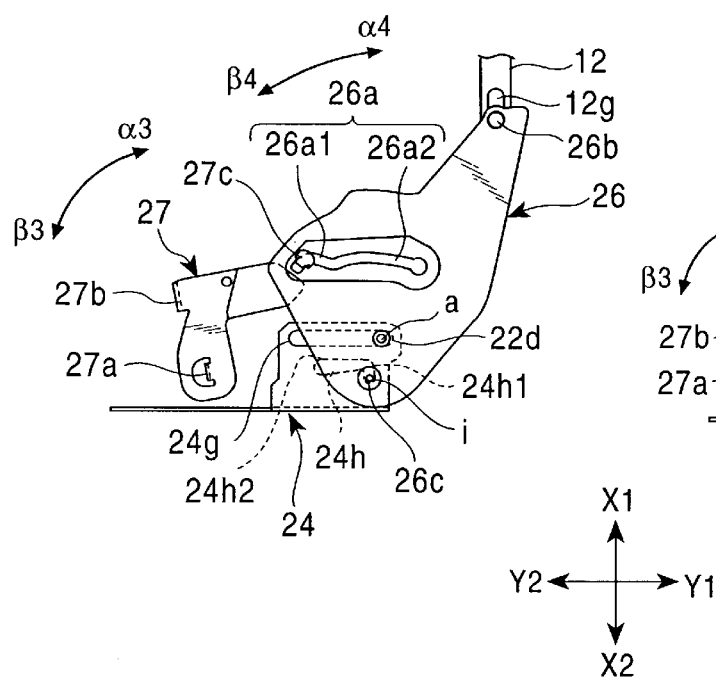
FIGS. 6A to 6D illustrated the relationship between an intermediate arm and a second sliding member (driving member)
Figure 6B:
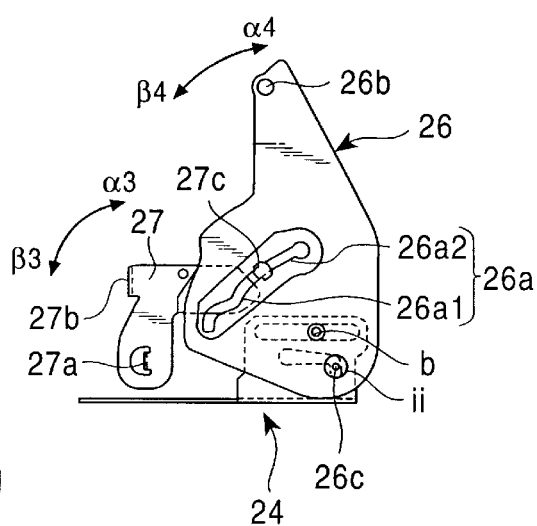
Figure 6C:
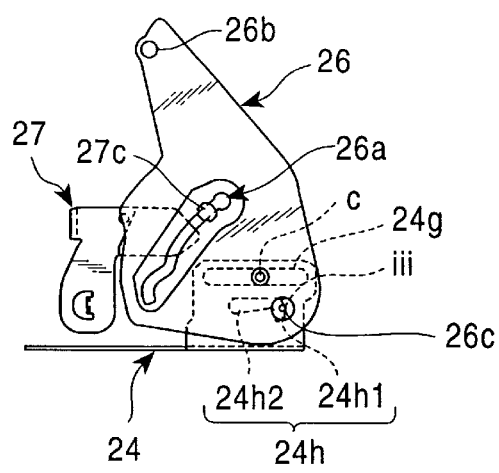

FIGS. 6A to 6D illustrate the relationship between the intermediate arm 26 and the third sliding member or driving member 24: FIG. 6A shows a standby state; FIG. 6B, a moving state of the rotated pin; FIG. 6C, a state in which the rotated pin leaves the transmitting section; and FIG. 6D, plan views showing recording and reproducing states, respectively.

FIG. 6A illustrates a standby state similar to that shown in FIG. 1A. When the holding member 12 and the intermediate arm 26 are in standby state, the third sliding member 24 has moved farthest on the Y2 side. At this point, the supporting shaft 22d provided on the upper plate 22A of the fixed chassis 22 at a position a in the long groove 24g formed in the third sliding member 24. The rotated pin 26c of the intermediate arm 26 is in a constrained state i in the transmitting section 24h1 of the driving groove 24h formed in the third sliding member 24. Also at this point, the bent piece 27c of the second pressing member 27 is in a rotated state in the β3 direction in the first arcuate groove 26a1 in the guide groove 26a of the intermediate arm 26.

As shown in FIG. 6B, when the MD is inserted into the holder 13 and the pushing force of the MD causes the intermediate arm 26 to rotate in the β4 direction, the bent piece 27c of the second pressing member 27 moves through the first arcuate groove 26a1, enters the second arcuate groove 26a2, and the second pressing member 27 rotates in the α3 direction. At this point, the rotated pin 26c of the intermediate arm 26 rotates in the β4 direction around the supporting shaft 22d, and takes a position ii in the transmitting section 24h1 of the driving groove 24h. Upon this rotation, the rotated pin 26c of the intermediate arm 26 presses the transmitting section 24h1 in the Y1 direction. The third sliding member 24 is therefore moved in the Y1 direction. As a result of rotation of the second pressing member 27 in the α3 direction, the second switch SW2 is changed over to off-state and the motor M is started.

FIG. 6C illustrates a state in which the third sliding member 24 is moved in the Y1 direction by the motor M to complete the introducing operation of the MD. The third sliding member 24, which is a driving member, moves in the Y1 direction by the driving force of the motor M. When the intermediate arm 26 is rotated to the position shown in FIG. 6C as a result of pressing of the rotated 26c against the transmitting section 24h1, the rotated pin 26c of the intermediate arm 26 escapes from the transmitting section 24h1 of the driving groove 24h, and moves to a position iii. Pressing of the rotated pin 26c from the transmitting section 24h1 is released, thus completing the introducing operation of the holding member 12 and the MD in the Y2 direction by the intermediate arm 26.

However, the motor M continues further to rotate, and the third sliding member 24 is moved in the Y1 direction via the driving arm 17. Even upon the completion of the introducing operation of the holding member 12 in the Y2 direction by the intermediate arm 26, therefore, the third sliding member 24 moves continuously in the Y1 direction, and the operation is transferred to the recording/reproducing position shown in FIG. 6D.

Figure 6D:
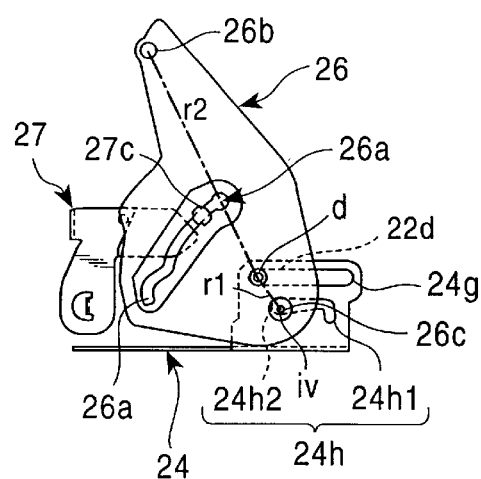

At the recording/representing position shown in FIG. 6D, constraint of all of the holding projections 15a, 15b, 15c, and 15d and the lifting pins 14a and 14b is released, and the unit B is in the non-locking state. The unit B is elastically supported by the elastic supporting members such as the dampers 30, 31, and 32 and the coil springs (not shown) in the interior on the fixed section side (the main enclosure 16 and the fixed chassis 22).

At this recording/reproducing position, the third sliding member 24 is in a state in which it has moved farthest in the Y1 direction. At this point, the supporting shaft 22d is at a position d in the long groove 24g on the Y2 side. The rotated pin 26c moves in the Y2 direction relatively in the driving groove 24h to a position iv in the relief section 24h2.

As shown in FIG. 7, the relief section 24h2 is formed with a slight margin for movement so that the rotated pin 26c is rotatable in the α4 and β4 directions with the supporting shaft 22d as a fulcrum, and the rotated pin 26c is in non-constrained state. In this state, the rotated pin 26c is movable within the relief section 24h2 with the supporting shaft 22d as the fulcrum, thus making the insertion pin 26b of the intermediate arm 26 rotatable in the α4 and β4 directions.

As shown in FIG. 6D, the rotation radius r2 of the supporting shaft 22d and the insertion pin 26b (connecting point with the engagement groove 12g) is larger than the rotation radius r1 of the supporting shaft 22d and the rotated pin 26c (r1 << r2). As a result, the slight margin for movement of the rotated pin 26c within the relief section 24h2 becomes a large margin for rotation of the insertion pin 26b in the α4 and β4 directions. That is, even when the insertion pin 26b largely rotates, it is possible to minimize rotation of the rotated pin 26c.

When vibration is applied to the disk driving apparatus A, at the aforementioned recording/reproducing position, vibrations in the up/down (Z-axis) direction, right/left (X-axis) direction, and forward/back (Y-axis) direction are three-dimensionally produced in the unit B elastically supported in the main enclosure 16 and the fixed chassis 22.

The intermediate arm 26 and the unit B are connected as a result of insertion of the insertion pin 26b of the intermediate arm 26 into the engagement groove 12g formed on the holding member 12 of the disk holding section B1. Consequently, vibration of the unit B in the Z-axis direction is allowed by the relative insertion and withdrawal of the insertion pin 26b of the intermediate arm 26 into and from the engagement groove 12g. At this point, the engagement groove 12g can freely vibrate with no constraint relative to the insertion pin 26b, thus permitting full display of functions of the elastic supporting members. As a result, it is possible to sufficiently absorb vibrations of the unit B. By providing a margin of length of the insertion pin 26b, it is possible to prevent the insertion pin 26b from coming off the engagement groove 12g upon occurrence of vibrations.

When vibration in the X-axis direction is produced in the unit B, the insertion pin 26b can relatively move in the engagement groove 12g extending in the X-axis direction. Therefore, since the unit B can freely vibrate in the X-axis direction, it is possible to fully absorb X-axis direction vibrations.

When vibration in the Y-axis direction is produced in the unit B, the inner wall of the engagement groove 12g of the holding member 12 presses the insertion pin 26b in the Y1 and Y2 directions. However, as described above, at the recording/reproducing position, the intermediate arm 26 is allowed to rotate in the α4 and β4 directions with the supporting shaft 22d as a fulcrum relative to the third sliding member 24, which is a driving member. The insertion pin 26b of the intermediate arm 26 can rotate in the α4 and β4 directions, following up the Y-axis direction vibration of the unit B without constraining the holding member 12, i.e., the unit B, thereby permitting sufficient absorption of the Y-axis direction vibration of the unit B as well.

Further, at the recording/reproducing position, the engagement groove 12g of the holding member 12 faces an expansion section 13c1 (see FIG. 3), which is the Y2 side end of the relief groove 13c of the holder 13. The expansion section 13c1 is formed with a width larger than the width of the relief groove 13c. At the recording/reproducing position, the insertion pin 26b passes through the expansion section 13c1, and is inserted into the engagement groove 12g of the holding member 12 positioned therebelow. As a result, the insertion pin 26b comes into contact with the relief groove 13c of the holder 13, thus permitting avoidance of constraint of the elastic supporting state of the unit B.

As described above, the unit B can freely vibrate in the X-axis, Y-axis, and Z-axis directions without being subjected to any constraint from the insertion pin 26b of the intermediate arm 26 during recording and/or reproducing operations, and the vibration absorbing function of the elastic supporting members never deteriorates. It is therefore possible to sufficiently absorb vibrations in the X-axis, Y-axis, and Z-axis directions produced in the unit B.

Discharging Operation of Recording Medium

Discharging operation of the MD is started, for example, by operating an eject button provided on the front panel (not shown) of the MD player, and carried out in steps in reverse sequence as the introducing operation described above.

The MD is transferred toward the disk insertion port (Y1 direction) by rotating operation of the intermediate arm 26 in the α4 direction while holding the MD in the holding member 12.

The holding member 12 is transferred to the standby position mentioned above, i.e., a position where the holding arms 12a and 12b face the notches 13f and 13g of the holder 13. At this point, the leading end of the MD on the Y1 side projects from the disk insertion port. As a result, the MD can be easily taken out by drawing it out by clamping in the discharging direction (Y1 direction).

Because the holding arms 12a and 12b face the notches 13f and 13g of the holder 13 at this point, the holding arms 12a and 12b can elastically deform in the direction in which the holding projections 12c and 12d leave the concave portions C1 and C1' of the MD upon withdrawal of the MD in the Y1 direction. Engagement of the MD by the holding projections 12c and 12d can be easily released, and therefore to take out the MD with a small force.

When the MD is transferred in the discharging direction, the shutter G is held by the transmitting section K1 of the closing member K. Therefore, during transfer of the MD in the discharging direction, the shutter G slides, and the opening window in the opened state is closed. After complete closure of the shutter G, the transmitting section K1 leaves the hole G1. As a result, the MD is discharged from the disk insertion port in a state in which the shutter G is closed.

In the discharging operation, the intermediate arm 26 moves in a sequence reverse to that in the introducing operation, from FIGS. 6D to 6A.

According to the present invention, as described above in detail, it is possible to reduce the weight of the unit (the disk holding/driving section) elastically supported by the fixed section, and hence to set a small vibration-proof space provided between the fixed section and the unit. This permits downsizing and thickness reduction of the entire apparatus.

In the recording/reproducing state, the holding member and the intermediate member are allowed to move relative to the driving member provided on the fixed section side. The unit having the holding members can therefore freely move without being constrained by the driving member, and the vibration absorbing function based on the elastic supporting members never deteriorates.

As a practitioner of ordinary skill in the art will realize, the present invention is capable of many variations. These variations include, but are not limited to, performing different analyses than those specifically described herein. All such variations to the invention come within the scope of the present invention.

We claim:

1. A recording medium driving apparatus to be used with a recording medium, the apparatus comprising:

a unit, the unit having:
  a driving section, the driving section receiving a recording medium, the driving section comprising means for recording information in said recording medium and means for reproducing information recorded in said recording medium, and
  a holding member, the holding member holding said recording medium, the holding member movable relative to said driving section in an inserting direction toward said driving section and in a discharging direction away from said driving section;

a fixed section;

an elastic support member, the elastic support member supporting said unit against said fixed section;

an intermediate member, the intermediate member movably supported on said fixed section and connected to said holding member;

a driving member, the driving member connected to said intermediate member, the driving member having a moving force, the driving member causing, by the moving force thereof, said holding member to move in said inserting direction and in said discharging direction via said intermediate member;

a connecting section, the connecting section connecting said driving member and said intermediate member;

a transmitting section, the transmitting section provided on said connecting section, the transmitting section for transmitting said driving force of said driving member to said intermediate member;

a relief section, the relief section provided on said connecting section, the relief section for making said intermediate member movable relative to said driving member after completion of movement of said holding member in said inserting direction, wherein said holding member is movable relative to said driving section while said holding member holds said recording medium.

2. A recording medium driving apparatus according to claim 1, wherein:

a driving groove comprising said transmitting section and said relief section arranged in succession is formed on any one of said driving member and said intermediate member;

a projecting section to be inserted into said driving groove is provided on the other one of said driving member and said intermediate member, the projecting section causing said holding member to move relative to said driving section;

said connecting section of said driving member and said intermediate member is formed by said driving groove and said projecting section;

the width of said driving groove becomes wider from said transmitting section toward said relief section;

when causing said holding member to move in said inserting direction, said projecting section is positioned in the transmitting section of said driving groove; and after the completion of movement of said holding member in said inserting direction, said projecting section enters said relief section of said driving groove.

3. A recording medium driving apparatus according to claim 2, wherein:
   said intermediate member is rotatably supported by said fixed section;
   said driving member is linearly reciprocatingly provided on said fixed section;
   said transmitting section and said relief section of said driving groove extend substantially perpendicularly to each other; and
   as said intermediate member rotates, said projecting section moves between said transmitting section and said relief section of said driving groove.

4. A recording medium driving apparatus according to claim 3, wherein the distance between the rotation center of said intermediate member and said projecting section is smaller than the distance between the rotation center of said intermediate member and a point at which said intermediate member connects to said holding member.

5. A recording medium driving apparatus according to claim 1 further comprising an engagement section, the engagement section connecting said intermediate member and said holding member to each other, the engagement section regulating movement of said holding member relative to said intermediate member in said inserting direction and said discharging direction, the engagement section regulating movement of said holding member perpendicularly to said inserting direction and said discharging direction.

6. A recording medium driving apparatus according to claim 5, where in s aid engagement section comprises:
   a pin on one of said intermediate member and said holding member, and
   a long groove formed on the other one of said intermediate member and said holding member, the long groove having a width substantially equal to the diameter of said pin, the long groove extending in a direction perpendicular to said inserting direction and said discharging direction, and
   said pin is inserted into said long groove.

7. A recording medium driving apparatus according to claim 6, wherein said pin remains inserted in said long groove upon elastic movement toward said fixed section.

8. A recording medium driving apparatus according to claim 1, further comprising:
   a regulating section, the regulating section engaging said unit and locking said unit with said fixed section upon movement of said holding member in said discharging direction, and
   a play section, the play section allowing elastic movement of said unit relative to said fixed section upon movement of said holding member in said inserting direction.

9. A recording medium driving apparatus according to claim 1, further comprising:
   a holder, and
   a lifting member,
   wherein the holder, the lifting member, and the holding member cooperate to form a holding section.

10. A recording medium driving apparatus to be used with a loaded recording medium, the apparatus comprising:
    a unit, the unit having:
       a driving section, the driving section receiving a loaded recording medium, the driving section comprising means for recording information in said recording medium and means for reproducing information recorded in said recording medium,
       a holder, the holder having means for accepting therein a recording medium, the holder movable in a first axis relative to said driving section in directions approaching and leaving said driving section, and
       a holding member, the holding member holding the recording medium inserted into the holder, the holding member movable in a second axis relative to said driving section in an inserting direction toward said driving section and in a discharging direction away from said driving section;
    a fixed section;
    an elastic support member, the elastic support member supporting said unit against said fixed section;
    an intermediate member, the intermediate member movably supported on said fixed section and connected to said holding member;
    a driving member, the driving member connected to said intermediate member, the driving member having a moving force, the driving member causing, by the moving force thereof, said holding member to move horizontally in said inserting direction and said discharging direction via said intermediate member;
    a connecting section, the connecting section connecting said driving section and said intermediate member;
    a transmitting section, the transmitting section provided on said connecting section, the transmitting section for transmitting said driving force of said driving member to said intermediate member
    a relief section, the relief section provided on said connecting section, the relief section for making said intermediate member movable relative to said driving member after completion of movement of said holding member in said inserting direction,
    wherein said holding member is movable relative to aid driving section while said holding member holds said recording medium.

11. A recording medium driving apparatus according to claim 10, wherein:
    a driving groove comprising said transmitting section and said relief section arranged in succession is formed on any one of said driving member and said intermediate member;
    a projecting section to be inserted into said driving groove is provided on the other one of said driving member and said intermediate member, the projecting section causing said holding member to move relative to said driving member;
    said connecting section of said driving member and said intermediate member is formed by said driving groove and said projecting section;
    the width of said driving groove becomes wider from said transmitting section toward said relief section;
    when causing said holding member to move in said inserting direction, said projecting section is positioned in the transmitting section of said driving groove; and
    after the completion of movement of said holding member in said inserting direction, said projecting section enters the relief section of said driving groove.

12. A recording medium driving apparatus according to claim 11, wherein:
    said intermediate member is rotatably supported by said fixed section;

said driving member is linearly reciprocatingly provided on said fixed section;

said transmitting section and said relief section of said driving groove extend substantially perpendicularly to each other; and as said intermediate member rotates, said projecting section moves between said transmitting section and said relief section of said driving groove.

13. A recording medium driving apparatus according to claim 12, wherein the distance between the rotation center of said intermediate member and said projecting section is smaller than the distance between the rotation center of said intermediate member and a point at which said intermediate member connects to said holding member.

14. A recording medium driving apparatus according to claim 10 further comprising an engagement section, the engagement section connecting said intermediate member and said holding member to each other, the engagement section regulating movement of said holding member relative to said intermediate member in said inserting direction and said discharging direction, the engagement section regulating movement of said holding member perpendicularly to said inserting direction and said discharging direction.

15. A recording medium driving apparatus according to claim 14, wherein said engagement section comprises:

a pin on one of said intermediate member and said holding member, and a long groove formed on the other one of said intermediate member and said holding member, the long groove having a width substantially equal to the diameter of said pin, the long groove extending in a direction perpendicular to said inserting direction and said discharging direction, and said pin is inserted into said long groove.

16. A recording medium driving apparatus according to claim 15, wherein said pin remains inserted in said long groove upon elastic movement toward said fixed section.

17. A recording medium driving apparatus according to claim 15, further comprising:

a relief groove, the relief groove formed in said holder in the same axis as said inserting direction and said discharging direction, the relief groove having a wider portion and a narrower portion, the wider portion being on the inserting end of the relief groove, the wider portion forming an expansion section, wherein:

said pin is inserted through the relief groove into said long groove, and said pin enters the expansion section upon completion of movement of said holding member in said inserting direction.

18. A recording medium driving apparatus according to claim 10, further comprising:

a first regulating section, the first regulating section engaging said unit and locking said unit with said fixed section upon movement of said holding member in said discharging direction, and a first play section, the first play section allowing elastic movement of said unit relative to said fixed section upon movement of said holding member in said inserting direction.

19. A recording medium driving apparatus according to claim 18 further comprising:

a second regulating section, the second regulating section engaging with said holder and locking said holder to said driving section upon movement of said holding member in said discharging direction, and a second play section, the second play section allowing elastic movement of said holder relative to said driving section upon movement of said holding member in said inserting direction.

20. A recording medium driving apparatus according to claim 10, further comprising:

a lifting member, wherein the lifting member, the holder, and the holding member cooperate to form a holding section.

* * * * *

UNITED STATES PATENT AND TRADEMARK OFFICE
CERTIFICATE OF CORRECTION

PATENT NO. : 6,327,114 B1
DATED : December 4, 2001
INVENTOR(S) : Akira Otsuki et al.

It is certified that error appears in the above-identified patent and that said Letters Patent is hereby corrected as shown below:

Column 21,
Line 33, delete "s aid" and substitute -- said -- in its place.

Column 22,
Line 38, delete "aid" and substitute -- said -- in its place.

Signed and Sealed this

Twenty-eighth Day of May, 2002

Attest:

JAMES E. ROGAN
*Director of the United States Patent and Trademark Office*

*Attesting Officer*